Jan. 13, 1959
R. E. KRUEGER
2,868,483
ANTI-ICING CONTROL SYSTEM
Filed Feb. 8, 1952
2 Sheets-Sheet 1
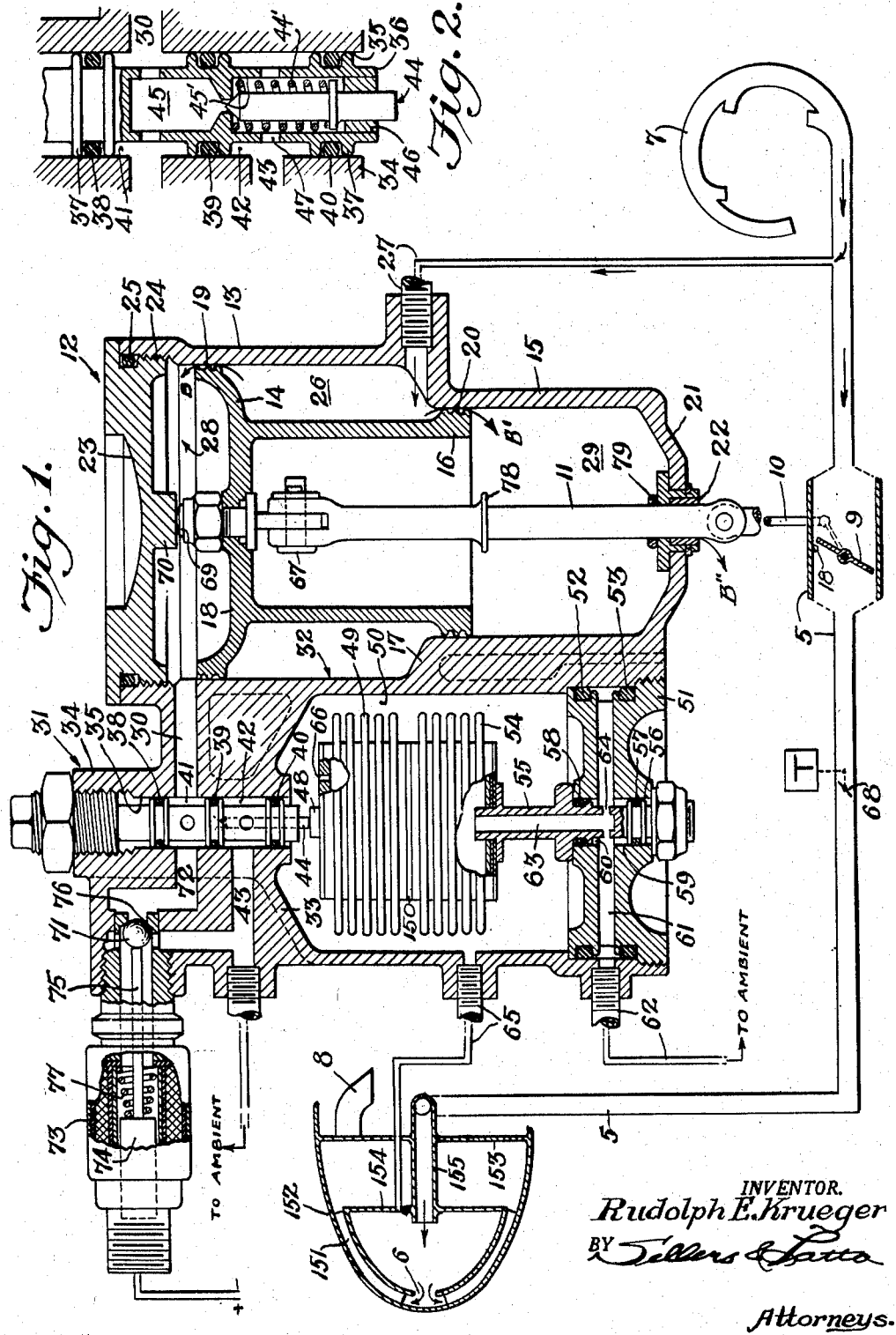
INVENTOR.
Rudolph E. Krueger
BY
Attorneys.

INVENTOR.
RUDOLPH E. KRUEGER
BY Sellers & Latta
ATTORNEYS.

United States Patent Office 2,868,483
Patented Jan. 13, 1959

2,868,483

ANTI-ICING CONTROL SYSTEM

Rudolph E. Krueger, Burbank, Calif.

Application February 8, 1952, Serial No. 270,572

12 Claims. (Cl. 244—134)

This invention relates primarily to fluid pressure controllers, and has as its general object to provide a safety valve for controlling at the inlet side of a duct or chamber, the pressure of a fluid which has passed through the valve and into the duct or chamber, in such a manner as to maintain such pressure below a selected maximum limit.

Among other useful applications, the invention may be applied to the control of anti-icing apparatus in aircraft wing installations in which heated air is circulated under a moderate pressure head through plenum chamber ducts, commonly known as D ducts, for distribution into heat exchange passages on the leading edges of the wings and empennage. Due to the large area exposed to pressure and the low bursting resistance of these D duct sections, it is a design requirement that the back pressure therein be accurately limited. Accordingly, a specific object of the invention is to provide, in a system for circulating heated air through such D ducts, pressure control means for restricting to a selected maximum the differential of pressure within the D ducts over ambient atmospheric pressure.

An important object of the invention is to provide a pressure limiting controller which will operate with a smooth regulating action, minus any "hunting," under all conditions ranging from mild, gradual pressure changes to rapid surges of pressure change. To this end, the invention contemplates a controller having a differential pressure sensitive primary control element aided by a rate-of-pressure-change sensitive element, operative to modify the response of the primary control element by resetting its control point in a manner to anticipate the effect of pressure surges and prevent them from carrying the pressure beyond the selected limit before the primary control element can act.

A further object of the invention is to provide a pressure controller in the form of a safety valve, adapted to become operative to modulate, restrict or shut off flow in any of several contingencies which may include (1) a rise in pressure to a maximum limit (2) a rise in temperature to a maximum limit, and (3) any failure of normal control mechanism which may depend on fallible mechanism such as electrical circuits. To this end, the invention aims to utilize a wholly mechanical and fluid pressure powered and controlled mechanism. More specifically, the invention contemplates a pressure limit safety control valve embodying a pneumatic servomotor for actuating the same together with automatic control means directly sensing the differential over ambient pressure, of the pressure on the downstream side of the valve, for supervising the operation of the servomotor; and overriding control means for vetoing the action of the automatic control means under either of emergencies (2) and (3) referred to above, and causing the servomotor to close the valve.

A specific object of the invention is to provide such a control valve which utilizes a pneumatic servomotor powered by a pressure head derived from the upstream side of the valve. More specifically, the invention aims to utilize a servomotor embodying piston means responding to a balance between the pressure delivered to a high pressure chamber of the servomotor and the pressure in one or more outlet chambers thereof, as determined by the rate of leak of air past the piston means.

A further object is to provide a safety valve such as that outlined above, in which overriding safety control is attained by dumping the pressure from one of the aforesaid outlet chambers of the servomotor. More specifically, the invention contemplates the provision of means responsive to remote control, for opening a dump vent. Such means may comprise a remotely controlled solenoid actuated valve in a dump vent.

In anti-icing installation of a jet propelled aeroplane, the volume of heated air (commonly extracted from the compressor manifolds of the jet engines which drive the plane) which must be made available for protecting the leading airfoil surfaces against icing under extreme conditions, is sufficiently high to develop the possibility of over-heating such surfaces when the anti-icing system is being operated. Therefore another common requirement in such systems is the protection of the wing and empennage structure against overheating. Accordingly, a further object of the invention is to provide a dual control system including a pressure responsive safety control mechanism cooperating with temperature responsive overheat control mechanism in such a manner as to limit the circulation of heated air through the D duct so as to maintain limits upon both pressure and temperature in the duct.

In the preferred arrangement of such dual controls, the overheat controller operates to override the pressure responsive safety controller in the event the temperature limit is reached. Such overriding operations may be effected through a "fail-safe" pilot valve adapted to modify the normal operation of the controller in a manner to shut off the system. Such a pilot valve could be actuated by sensing means other than temperature limit sensing means and a further and more general object of the invention is to provide a pressure limit safety valve actuating controller having a remotely controlled overriding pilot valve for effecting the closing of the safety valve under abnormal conditions.

In an anti-icing system of the general type to which the invention is applied, in the most common situation the primary requirement for governing the volume of flow through the D duct is that of maintaining just sufficient flow to amply correct for any drop in temperature of the leading air-foil surfaces below a selected minimum limit. Under varying conditions, this requirement may call for circulation of air anywhere within the range of zero to top limit pressure differential in the D-duct, the flow of air being a function of the pressure differential across the heat exchange passages constituting a restriction in the flow system. Accordingly, a further object of the invention is to provide a pressure differential responsive safety valve controller adapted to be used as a limiting control in combination with a primary controller which is a temperature responsive one. Such temperature responsive primary controller may be and preferably is a part of the temperature responsive control mechanism which includes the overheat control. A further object is to provide an overall control system embodying the combination of temperature responsive primary control, and pressure limit responsive overriding safety control. A still further object is to provide such a system in which both of the said overriding controls operate through a common safety valve controller unit.

A still further object is to provide a primary temperature responsive control mechanism, the action of which is modified by a secondary control unit, responsive to changes in the pressure head in the D ducts, in a manner to prevent over-controlling by the primary controller. This is accomplished by resetting the temperature control point of the primary control mechanism by the pressure response of the secondary control unit, in accordance with pressure changes in the D duct resulting from the temperature responsive action of the primary control mechanism. Such resetting is utilized to solve the problem presented by the relation between total heat units in the air passing through the D ducts (at any given temperature of such air) and the pressure differential across the D-duct, while relation is: total B. t. u. per unit time at any given temperature is directly proportional to flow (in lbs. per unit time) and therefore directly proportional to the square root of the pressure differential. For most satisfactory results, I have utilized, as a part of the secondary control unit, actuated by changes in the pressure differential, a rheostat which is taper-wound to match changes in resistance in the secondary control circuit directly to changes in weight-flow of the air.

It is possible to utilize such a pressure responsive modification of a temperature responsive primary control to normally control the pressure in the D duct to avoid excess pressures therein. Accordingly, a further object of the invention is to provide, in a system such as that outlined above, an arrangement such that normally the flow of heated air will be under the control of a temperature responsive regulator with a pressure responsive means for modifying the operation thereof in a manner to normally prevent the pressure head exceeding a selected top limit, together with a pressure responsive safety control adapted to protect the D duct structure against excessive pressures in the event of failure of the primary control mechanism, the safety control mechanism involving a direct mechanical connection between a pneumatic type actuator, powered by the pressure differential, so as to prevent any possibility of the same failing to operate as a result of failure of an electrical system which is utilized in the primary control mechanism.

Other objects will become apparent in the ensuing specifications and appended drawings in which:

Fig. 1 is a composite sectional view of the main control of the system, incorporated in a schematic diagram of the anti-icing system;

Fig. 2 is a detail sectional view of the pilot valve unit; and

Figure 3:
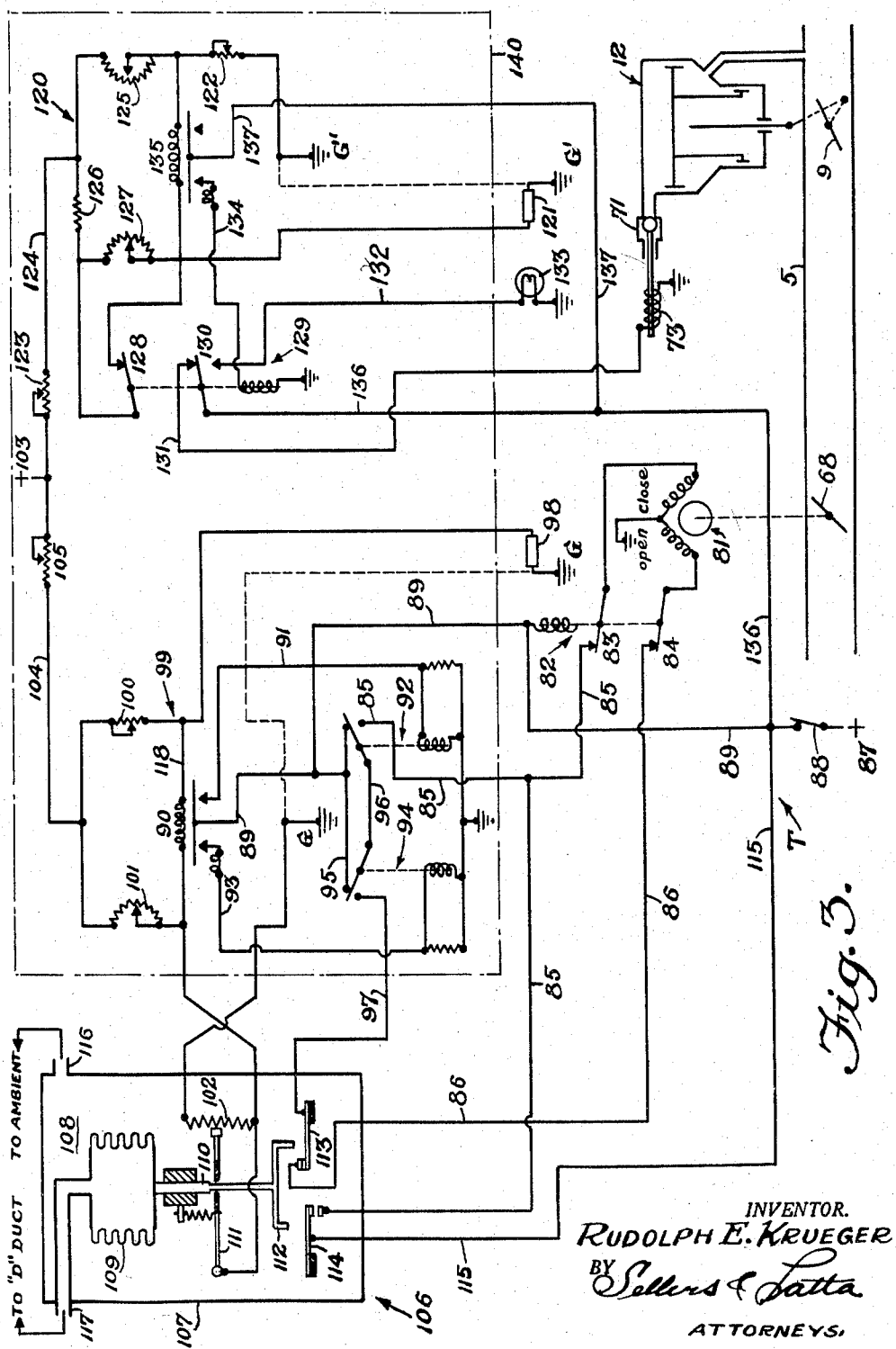
Fig. 3 is a schematic diagram of the entire control system.

*Anti-icing mechanism to which the invention is applied*

As an example of one form in which the invention is embodied, I have shown in the drawing, schematically, a cross-section through a D duct 154 within the leading edge of an aircraft wing. The wing leading edge skin section 152 is joined to the D duct 154 by chordwise extending partition members 151 (usually consisting in the consecutive folds of a corrugated sheet of metal which conducts heat to the skin 152). Defined between members 151, skin 152 and duct 154 are a plurality of restricted heat-exchanger passages into which heated air is delivered by D duct 154 through a series of apertures 6. The aggregate heat-exchange area of these restricted passages is less than that of conduit 5, so that a pressure head is developed in duct 154. Air under pressure is carried to D duct 154 by an inlet tube 155 constituting a terminal portion of a supply conduit 5.

Heated air under pressure may be taken from the compressor manifolds of the jet engines by extraction manifolds 7. After passing chordwise (fore-aft) through the restricted passages between members 151, the air discharges therefrom into the space between D duct 154 and wing spar 153, flowing spanwise in said space to discharge outlets 8 located in the wing tips.

Suitable primary control mechanism, responsive to temperature, and indicated generally at T, may be utilized to operate a valve 68, in series with valve 9 normally open to normally control flow in the conduit 5. Such temperature control mechanism will be described more in detail hereinafter.

*The safety control valve of the invention*

The present invention provides apparatus for controlling a safety valve 9 in the above outlined anti-icing mechanism so as to prevent the pressure head in duct 154 over ambient pressure exceeding a selected maximum value. The control system operates upon the flow of air through inlet duct 5, utilizing a valve such as the butterfly valve 9 to throttle the flow of air to the discharge end of conduit 5. Valve 9 is connected through any suitable linkage, indicated generally at 10, to the piston rod 11 of a pneumatic servomotor 12. Servomotor 12 embodies a dual piston and cylinder arrangement, including a large cylinder 13, a large piston 14 slidably operating therein, a small cylinder 15, and a small piston 16 slidably operating therein. The two cylinders and two pistons are coaxial and arranged in end to end relation, with the cylinders 13 and 15 integrally connected by an annular offset shoulder 17. Piston 16 projects from piston 14 in an axial direction in the form of a skirt. Pistons 14 and 16 are embodied in an integral unit having at remote axial extremities thereof, radially extending lands 19, 20 respectively, which are fitted to the inner walls of cylinders 13, 15 respectively with a slight air leak tolerance to provide restricted bleeds as indicated by arrows B and B'.

At the outer end of cylinder 13 is a cylinder head 23 which is removably mounted in any suitable manner as by means of a threaded flange connection 24 and a gasket 25, providing a complete pneumatic seal.

Piston rod 11 is pivotally attached to the piston assembly through connecting means indicated generally at 67. Such means may include a stud 69 to engage a boss 70 in cylinder head 23 to establish a limit of movement of piston 14 toward head 23.

At its outer end, cylinder 15 has a cylinder head 21 in the center of which is a bearing bushing 22 through which piston rod 11 is slidably extended, with sufficient tolerance to provide a free air bleed along stem 11, as indicated by arrow B''.

Defined between piston 16, cylinder 13, piston 14 and offset wall 17, is a high pressure chamber 26 into which power supply air is delivered from duct 5 from the upstream side of valve 9, through a power supply bleed line 27. From high pressure chamber 26, air leaks past pistons 14 and 16, as indicated by the respective arrows B, B', into an intermediate chamber 28 defined between piston head 18 and cylinder head 23; and, respectively, into an intermediate pressure chamber 29 defined between piston 16, cylinder 15 and cylinder head 21. From chamber 29, air leaks along stem 11, through bushing 22, as indicated by the arrow B'' sufficiently freely to maintain a low pressure in chamber 29, approaching ambient (the optimum desideration). From chamber 28 air is discharged through an outlet duct 30 past a pilot valve (indicated generally at 31), to the atmosphere surrounding the control unit.

Automatic pressure responsive control of servomotor 12 is effected by a control unit, or "brain," contained in a housing 32 which may be physically separated from the servomotor if desired, but, in the particular embodiment shown, is formed integrally with the cylinders 13 and 15, as a part of the overall casing of the control unit. Housing 32 has a head 33 terminating in a neck 34. Neck 34 constitutes the casing of pilot valve 31 and has therein a cylindrical bore 35. A pilot valve core 36, mounted in bore 35, has a plurality of pairs of radial flanges 37 defining annular channels in which are confined sealing rings 38, 39 and 40. Rings 38, 39, 40 engage the wall of bore 35 to define an annular passage 41 communicating with outlet 30 and an annular passage 42. Passage 42 communicates with an outlet vent 43 through which, under control of pilot valve unit 31, the air from chamber 28 is metered to a region of lower pressure (e. g. ambient atmosphere).

A metering pin 44 controls the flow of air from one end of a passage 45 in valve core 36, the other end of passage 45 communicating, through annular passage 41 and outlet 30, with chamber 28. Metering pin 44 is mounted for sliding movement in a counterbore 45' forming a coaxial continuation of passage 45, and in a bushing 46 in the end of bore 45'. The stem of pin 44 slides in bushing 46 with a sufficiently close fit to substantially eliminate flow from bellows chamber 50 to low pressure vent 43. A valve seat in the form of an offset between passage 45 and counterbore 45' cooperates with the nose of metering pin 44 to obtain the metering action. From counterbore 45', air may pass through a short radial passage 47 into annular passage 42 from whence it may escape through outlet vent 43.

The butt end of metering pin 44 abuts against a suitable bearing boss 48 on the head of a rate-of-pressure-change responsive, reset bellows 49 which is disposed within a chamber 50 inside bellows housing 32. Chamber 50 is defined between housing 32, integral head 33 thereof, and a head 51 which is removably mounted in the other end of housing 32, with axially spaced annular gaskets 52 and 53 sealing the same to the housing 32. A spring 44' urges pin 44 in valve opening direction.

Reset bellows 49 is mounted upon (in series with) a D. P. (differential pressure responsive) bellows 54 which in turn is mounted upon a tubular stem 55. Stem 55 has radial flanges 56, disposed in pairs to define channels in which are received annular sealing rings 57 and 58, the flanges 56 and sealing rings 57, 58 functioning to pilot the stem 55 in a bore 59 in the center of head 51, and to define in said bore, around the stem 55, an annular passage 60. Passage 60 communicates, through a radial passage 61 in head 51, and a connecting tube 62, with ambient atmospheres, as indicated. Stem 55 is hollow, having a central bore 63, the upper end of which communicates with the interior of bellows 54, and the lower end of which terminates in a radial passage 64 communicating with annular passage 60.

It will now be apparent that ambient pressure is communicated to the interior of D. P. bellows 54 through passages 62, 61, 60, 64, 63. Bellows 54 and 49 are externally subjected to the pressure in D-duct 154 through a tube 65 connecting chamber 50 to the D-duct.

Reset bellows 49 has a bleed orifice 66 allowing flow at a predetermined restricted rate between the interior of the bellows and the chamber 50. Normally the pressures interiorly and exteriorly of bellows 49 will be equalized, but in the presence of pressure change in chamber 50, bellows 49 will temporarily be subjected to a pressure differential which will contract or expand the same in accordance with the nature of such change.

Bellows 54 and 49 are preloaded to the maximum limit value of the pressure head in D-duct 154. Bellows 54 has a control point equivalent to the maximum pressure limit to be enforced by the valve, will contract to its control length only when the pressure reaches the limit value, and is operative to actuate metering pin 44 to modulate the pressure at the limit value as long as the pressure inside the bellows 49 is equalized with the pressure in chamber 50.

Overide control is furnished by a dump valve 71 normally closing a dump outlet 72 in pilot valve casing 34, said dump outlet communicating with outlet 30 through annular passage 41. Valve 71 is arranged to be actuated by a solenoid 73, under the control of suitable remotely operating overriding control means, as hereinafter specified. Armature 74 of solenoid 73 has a stem 75 which normally holds valve 71 against its seat 76, under the push of armature 74 when the solenoid is energized. A spring 77 retracts the armature and stem when the solenoid is deenergized. Opening of valve 71 places dump outlet 72 in communication with outlet 43 and thus with a lower pressure area (e. g. ambient).

On stem 11 of servomotor 12 is a shoulder 78 which, when safety valve 9 is wide open, will engage an O ring seal 79 on bushing 22, to shut off the bleed through bushing 22. Thus, in normal operation of the entire system, there will be no consumption of power bleed air (no flow through conduit 27). The same is true when the pressurel imit is not exceeded or approached.

*Operation of safety valve*

As long as heated air is being pumped through conduit 5 into D duct 154, the pressure in the duct upstream of valve 9 will be delivered through pressure line 27 into high pressure chamber 26 of the control unit. From high pressure chamber 26 it leaks past pistons 14 and 16 as indicated by the arrows B, B'. It leaks into low pressure chamber 29 and also chamber 28 at a rate which is directly proportional to the pressure in chamber 26. It is allowed to escape from chamber 28 under the control of pilot valve 31 which is actuated by the combined response of D. P. bellows 54 and rate bellows 49.

The high pressure in chamber 26, acting against area of piston 14 outwardly of piston 16, plus the low pressure in chamber 29 acting against piston 16 is balanced by the pressure in chamber 28 acting against the full area of piston 14. When pilot valve 31 is closed, the pressures in chambers 26 and 28 will substantially equalize, and, with substantially the same pressure acting in chamber 28 against an area much larger (e. g. twice as large) as the area subjected to the same pressure in chamber 26, the piston unit will move toward head 21 until shoulder 78 engages O ring 79, whereupon valve 9 will be fully open. When pilot valve 31 is opened, reducing pressure in chamber 28, the piston unit will move toward head 23 to close valve 9.

Pressure changes in D duct 154 produce corresponding changes in pressure in chamber 50, communicated through sensing tube 65. Where a pressure rise is very gradual, so as to impose no pressure differential on bellows 49, the combined deflection of bellows 49 and 54 will equal the pre-load deflection of these bellows only when pressure in chamber 50 reaches the limit value (normal control point), and bellows 54 will control the pilot valve 31 at the limit value. When, however, the pressure rise is extremely rapid, pressure in chamber 50 will temporarily exceed that within bellows 49, both bellows will be deflected, and the combined deflection will equal the pre-load before the absolute pressure in chamber 50 and D duct 154 has reached the limit value. Since bellows 54 can control only at the limit value, it would be unable in itself to check a rapid pressure rise at the limit value, and hunting would result, except for the intervention of rate bellows 49, the deflection of which, added to the deflection of bellows 54, arrests the rise sufficiently in advance of the limit value, to prevent such hunting.

Whenever the combined deflection of the two bellows under either a slow or rapid pressure rise in chamber 50, exceeds the pre-load, metering pin 44, under the urge of spring 44', will become unseated, reducing pressure in servomotor chamber 28, and effecting a closing movement of valve 9. The immediate effect of such response is to check the rise, even though there may exist a call for more duct flow (requiring more pressure) than momentarily exists. However, the action of bellows 49 in suppressing the pressure rise is a diminishing one, governed by the gradual bleeding off through orifice 66 of the differential momentarily set up by the rapid pressure rise. As pressures externally and internally of bellows 49 are thus equalized, bellows 49 will resume its normal free length, causing pilot valve 31 to move in closing direction and valve 9 to correspondingly open, whereby the duct pressure will gradually rise until, at the limit value, control will be restored to bellows 54 and the latter will modulate the pressure at the limit value (unless the pressure rise is checked by the temperature responsive control mechanism as the result of the demand for heat being satisfied).

The action of bellows 49 may be properly described as a temporary resetting of the control point of the bellows assembly, from the normal control point determined by bellows 54 at the limit value, to a much lower value, with a gradual return of the control point to the limit value at as rapid a rate as possible, in order to provide maximum satisfaction of any demand for higher pressure and flow in the system. To this end, the orifice 66 is sufficiently large to provide a rapid recovery of bellows 49 from the effect of any pressure change. I have found that for satisfactory operation it is necessary to correlate the size of orifice 66 and the spring load rating of bellows 49 with the range of pressure differentials and air flow capacity in the system, so that the rate of recovery of bellows 49 will be (a) sufficiently slow to arrest any pressure rise before bellows 54 is placed in control, and (b) sufficiently rapid to effect the restoration of control to bellows 54 as rapidly as bellows 54 can assume control without allowing the pressure rise to overshoot the limit value.

Bellows 49 is needed most urgently in the presence of an excessively rapid pressure increase, or surge, of considerable magnitude, which would sweep the pressure head far above the permissible maximum, if bellows 54 were in undisturbed control. Under such conditions, if sufficiently severe, bellows 49 will collapse completely out of contact with metering pin 44 (with substantially the action of an aneroid) allowing valve 31 to fully open, instantaneously dumping the pressure from chamber 28, and causing servomotor 12 to instantly move valve 9 to flow throttling direction (in anticipation of the closing action which eventually will be required by action of the D. P. bellows 54) in closed position. Momentarily, duct pressure rise will be arrested, suppressing the surge, and arresting the pressure rise in chamber 50 reflected from the surge. This sequence of responses will necessarily consume a small interval of time, during which the bellows 49 has collapsed and has then immediately started to recover at its controlled rate. Under all conditions including the extreme surge conditions being considered, the actual arrest of the surge will commence at a point well in advance of arrival at the limit pressure, and the corrective action of bellows 49 will have been largely dissipated by its rate-of-change recovery by the time the reflected pressure in chamber 50 stops rising and commences to reduce in response to the lowering of duct pressure. If the surge producing conditions then cause a further substantial rise in duct pressure, it may be necessary for bellows 49 to again act to arrest the further rise. The entire procedure will be essentially one of continued throttling action (either intermittent or steady) until the upsetting conditions are eliminated and the system has become stabilized. If the orifice 66 is too small for a particular installation, a number of such fluctuations (hunting) of control action by bellows 49 might occur before stabilization of the system could be effected. The greater the restriction of orifice 66, the greater is the tendency for bellows 49 to hunt. The size of orifice 66 and softness of bellows 49 are therefore adjusted to the characteristics of bellows 54 and the needs of the installation, so as to arrive at a satisfactory balance between ample anticipatory action by bellows 49 in the early suppression of surges, on the one hand, and rapid dissipation, by rate action, of the response of bellows 49 so as to minimize its hunting and return the control to bellows 54 as rapidly as possible, on the other hand; the optimum action, aimed at by the invention, being one in which there is a smooth transition from the initial maximum reset of the control point to the final stage of restoration of the control point to the full limit value, with no reversal in the change of control point (no hunting). This is attained primarily by making the area of aperture 66 as large as possible without destroying the ability of bellows 49 to assume control in the presence of surge, and by providing a substantial differential between the spring load ratings of the two bellows. It will be understood that with a softer bellows, a large orifice may be used, and vice versa.

The characteristics of the bellows assembly having been selected for optimum performance under maximum surge conditions, response to more moderate pressure rises will also be satisfactory, the usurpation of control by bellows 49 being less, and the maintaining of control by bellows 54 being more pronounced as the rapidity and magnitude of pressure change is lower.

Embodiment in complete control system

Fig. 3 illustrates schematically one embodiment of the invention in a complete control system including temperature responsive control mechanism for normal control operations.

The control mechanism embodies a balanced electrical bridge circuit, and is comprised largely of three units, as follows:

(1) A control box 140, incorporating (a) a Wheatstone bridge 99 for primary, normal temperature control, responding primarily to a pilot control element consisting in a thermostat 98. Bridge 99 has a reversing or polarized relay 90 in the bridging circuit thereof; and (b) an overheat control bridge 120, responsive to overheat conditions;

(2) A secondary, pressure responsive follow-up or resetting control 106 which cooperates with the primary control bridge 99 in controlling the operation; and (3) A reversible electric servomotor 81, which directly actuates primary control valve 68.

The function of bridge 99 and pressure responsive unit 106 is to cooperatively control flow in duct 5 in accordance with temperature conditions in the leading edge skin 152, with an increase in flow whenever a drop in temperature calls for more heat; with a follow-up action from pressure responsive unit 106 which throttles the temperature responsive action of bridge 99 to avoid hunting; and with a pressure limit operation by unit 106 which overrides the temperature response whenever the pressure approaches the predetermined maximum limit in the D duct. The function of overheat control bridge circuit 120 is to normally maintain solenoid 73 energized so as to maintain valve 71 closed and pneumatic controller 12 normally operative; with an overriding action in response to an increase of temperature in the skin 152 to substantially the selected maximum temperature limit, through which solenoid 73 is deenergized, valve 71 is opened, and pneumatic controller 12 is rendered operative to fully close valve 9 to shut off the system.

The respective field coils of servomotor 81 are placed in communication with respective energizing conductors 85, 86 through a relay 82, which embodies a pair of switches 83 and 84 each having one contact connected to a respective conductor 85, 86. Relay 82 is energized at all times when the system is set for automatic operation by closing a manual switch 88 connecting an electric power source 87 to a power lead 89 to which relay 82 is connected.

For normal operations, current for energizing servomotor 81 comes from the source 87 through conductor 89 to the two-way swinging switch arm of polarized relay 90. Relay 90 when in one position distributes the current through a conductor 91 to the energizing coil of a power relay 92, and in its other position distributes current through a conductor 93 to a power relay 94. Each of the relays 92, 94 embodies a two-way switch having a swinging contact normally engaged with a contact connected by a conductor 95 to power lead 89. The swinging contacts of these dual relay switches are joined by a conductor 96. Consequently, when one of the relays 92, 94 is energized, its swinging arm is drawn against a second contact, connected respectively to a conductor 85 or 97, the other switch bringing the electric current to the energized relay through joining conductor 96.

Energization of relay 92 will establish a circuit through switch 83 of relay 82 to energize servomotor 81 for closing valve 68. Control of relay 92 is a direct thermo-responsive one, originating in a thermistor (thermo responsive resistance) 98 electrically positioned in one arm of Wheatstone bridge 99. Physically, thermistor 98 is attached to a leading edge skin 152 of the D duct 154, to register the D duct temperature. The Wheatstone bridge 99 includes, in its three other arms, a resistor 100, a manually adjustable potentiometer 101 and a pressure responsive rheostat 102, the latter plus thermistor 98 being disposed in one side of the bridge circuit and resistor 100 and potentiometer 101 being disposed in the other side of the bridge circuit. Said one side of the bridge circuit is grounded at G, and said other side of the bridge circuit is connected, intermediate elements 100 and 101, to a source 103 of control current, through a conductor 104 and resistor 105. Temperature control point selection, in bridge 99, is obtained by adjusting potentiometer 101, which is manually adjustable.

Rheostat 102 is a part of pressure responsive control unit 106, which includes a housing 107 defining a control chamber 108 in which is disposed a pressure responsive element (e. g. bellows) 109. Bellows 109 has a stem 110 which has a lost motion connection with moving contact arm 111 of potentiometer 102, and also carries a two pronged actuator 112 for engaging, in the order named, the respective switch arms of a pair of switches 113 and 114. Switch 113, a normally closed one, normally establishes a connection between conductors 97 and 86. Switch 114, a normally open one, is adapted to establish a connection between a branch of conductor 85 and a conductor 115 leading directly from power source 87 through switch 88.

Bellows 109 is subjected externally to the pressure in chamber 108 which corresponds to ambient pressure communicated thereto through a reference line 116, and is subjected internally to D duct pressure, through a reference line 117. Thus bellows 109 constitutes a differential pressure responsive element, responding to the differential between ambient and D duct pressures, contracting in response to a decrease in said differential and expanding in response to an increase therein. The length of the bellows is determined by the balancing of its inherent spring force against the pressure differential.

Energizing of relay 94 will establish a circuit from current source 87, through relays 92 and 94 in the order named, conductor 97, switch 113 and conductor 86, to energize the servomotor 81 for opening valve 68.

Relay 90 is controlled by the flow in the bridging conductor 118 of bridge 99, closing in one direction in response to flow in one direction in conductor 118 and closing in the other in response to flow in the opposite direction in conductor 118. The direction of flow is controlled by the balancing of resistances in thermistor 98 and rheostat 102.

Rheostat 102 provides a follow up action for resetting the bridge circuit in response to pressure changes in the D duct. For example, for any increase in resistance in thermistor 98 resulting from a drop in temperature in the D duct, followed by an opening of valve 68 to increase pressure and temperature in the D duct, there will be a corresponding increase of resistance in rheostat 102 caused by extension of bellows 109 under the pressure increase, thereby causing the bridge circuit to be partially re-balanced prior to the warming up of the thermistor.

Rheostat 102 is taper-wound to match the corrective changes in resistance therein directly to the changes in weight-flow (flow in weight units per unit time) of air in the D-duct.

The characteristics of rheostat 102 may be determined by plotting changes in pressure differential against resulting changes in weight flow per unit time (which is directly indicative of changes in heat units per unit time, in the flowing air). The resultant plotted curve is a square root curve, which determines for the rheostat 102 a generally triangular shape.

Thus the pressure responsive unit 106, in response to each pressure change resulting from an imbalance of the bridge originating in the response of thermistor 98, executes a pressure responsive deflection of bellows 109, which rebalances the bridge at the changed position of valve 68. The response of thermistor 98 is sufficiently rapid so as to resume control and effect further opening of valve 68 whenever required.

Overheat control is provided for by bridge circuit 120 under the control of a thermistor 121 mounted on structure most likely to overheat. Thermistor 121 is grounded at G', to the structure. Thermistor 121, together with a resistor 122, are located in the ground side of the bridge 120, and in the other side (connected to power source 103 by a resistor 123 and conductor 124) are located, in one arm a potentiometer 127. Potentiometer 127 is normally shunted by a switch 128 of a double relay 129. Relay 129 has a second switch 130, which is a double throw switch, normally closed against a contact which is connected to a condctor 131 for energizing overheat control solenoid 73. The alternate contact of switch 130 is connected through a conductor 132 to an overheat indicator lamp 133. Relay 129 is energized through a conductor 134 connected to the fixed contact of a relay 135 which is disposed in the bridging circuit 136 of bridge 120. Relay 135 is closed when the flow in bridging circuit 136 is in one direction and is opened when the flow is in the other direction. Switch 130 receives current from power source 87 through a conductor 136, from which the movable arm of switch 130 distributes the current either to the warning light 133 or to the solenoid 73 in accordance with existing conditions. Power for energizing relay 129 comes from the power source 87, through a conductor 137, relay 135, and conductor 134.

Valve 9 is slightly blocked (as by an abutment 18 in duct 5) against complete closure of the duct, whereby a small flow of air will be maintained at all times, to maintain thermistor 121 constantly responsive to true temperature conditions as determined by circulation of air through the D duct, rather than being merely responsive to residual heat in the internal structure to which it is attached. Under the latter conditions, if they existed, thermistor 121 might, after initially responding to an overheat condition, prevent the resumption of control by thermistor 98, even though severe icing conditions on skin 152 might demand a large flow of heated air in the D duct.

*Operation of overall system*

Assuming that overheat relay 120 is in normal condition, maintaining solenoid 73 energized and pneumatic controller 12 normally operative to maintain valve 9 open, control of the system will be under the cooperative direction of primary control bridge 99 and pressure responsive unit 106. Assuming icing conditions under which thermistor 98 calls for more heat, bridge 99 will be unbalanced in a direction to actuate reversing relay 90 to close the circuit including power source 87, conductors 89 and 95, relay 92, conductor 96, relay 94, conductor 97, switch 113 of pressure responsive unit 106, conductor 86, switch 84, and valve opening side of servomotor 81, thus actuating valve 68 in the opening direction to amplify the flow of heated air to the D duct. This amplified flow will result in an increase in the pressure head in the D duct, which will be sensed by bellows 109 with an expanding action, actuating potentiometer 102 to rebalance bridge 99, thus resetting the temperature control point and modifying (throttling) the action of servomotor 81 in opening valve 68. If the demand for more heat is not satisfied by such modified operation, thermistor 98 will quickly respond to again condition the circuit for renewed actuation of servomotor 81 in opening valve 68. If the demand for more heat is not satisfied by such modified operation, thermistor 98 will quickly respond to again condition the circuit for renewed actuation of servomotor 81 in valve opening direction.

At pressure limit conditions, the action of potentiometer 102 in rebalancing the bridge 99 is supplemented by the action of switch actuator 112 in opening switch 113 to break the circuit to servomotor 81. Switch 113 is actuated when D duct pressure approaches the top limit, and functions to arrest the opening operation of servomotor 81 independently of the demand for heat. In the event that the pressure in the D duct should further increase (due to increase in engine pressure, with valve 68 wide open) switch 114, which is actuated at a slightly higher pressure than switch 113, will close, energizing the closing side of servomotor 81 through circuit 85, with power supplied directly through power lead 115, so as to move valve 68 in closing direction.

When the demand for heat decreases, bridge 99 will be unbalanced in the opposite direction, reversing relay 90 to establish a circuit through power lead 89, conductor 91, relay 92, thereby setting up a valve closing circuit from power lead 89 through conductor 95, relay 94, conductor 96, relay 92, conductor 85, and switch 83 to the closing side of the servomotor 81. This temperature responsive action will be modified by the resetting action of 106, in the reverse direction from that previously described, operating potentiometer 102 to rebalance the bridge 99, and thus arrest or reverse the operation of servomotor 81.

In the normal operation of the bridge 120, current will flow across bridging circuit 136 in the proper direction to maintain relay 135 open, thus maintaining relay 129 deenergized, and switches 128 and 130 in the normal positions shown in the drawing, with switch 128 closed and switch 130 in the position to maintain solenoid 73 energized and valve 71 closed. With switch 128 closed, potentiometer 127 is shunted out of the bridge circuit, and potentiometer 125 is balanced against resistance 126.

In the event the temperature of the duct skin reaches the predetermined maximum limit, the resulting change in resistance of thermistor 121 will upset the balance in bridge 120 so as to close relay 135, energize relay 129, shift switches 128 and 130 to their alternate positions from those shown, and thus remove the shunt from potentiometer 127; break the circuit to solenoid 73 (resulting in opening of valve 71 to dump the pressure from chamber 28 of safety valve controller 12, causing safety valve 9 to close) and closing circuit to indicator light 133 to indicate the overheat condition to the pilot.

The removal of the shunt across potentiometer 127 results in maintaining the valve 71 open and the safety valve 9 closed, until temperature has receded a predetermined amount from the maximum limit. When this has occurred, the bridge will be balanced through potentiometer 127, sufficiently to cause the relay 135 to reopen, thus restoring the overheat control circuit to its normal condition, with solenoid 73 reenergized to close valve 71 and reestablish the pneumatic actuation of controller 12 to reopen safety valve 9, and with warning light 133 extinguished.

The degree of spread between the top temperature limit and the limit at which normal control will be restored to pneumatic controller 12 by reenergizing solenoid 73, may be adjusted by adjusting the manually adjustable potentiometer 127. Further adjustment of the bridge 120 for initial balancing thereof may be obtained through adjustment of potentiometer 125.

In the event of excessive pressure in the D duct at any time, under any temperature condition or in the event of breakdown of the electrical circuit, control of the system will be taken away from both of the temperature heat control units by the pneumatic controller 12, mechanically actuating safety valve 9 toward the closed position to throttle the flow in duct 5, in accordance with the operation described in detail hereinbefore. Controller 12 will restore control to the temperature responsive units whenever the excessive pressure is relieved. Preferably, the controller 12 is set to take over control at a pressure just slightly higher than the maximum pressure limit at which pressure responsive unit 106 closes switch 114 for throttling the flow.

In Fig. 1, numeral 150 indicates a separator plate joining bellows 49 to bellows 54 and pneumatically separating these bellows from each other.

I claim:

1. A control system for maintaining a preselected pressure differential in an anti-icing D-duct on the leading edge of an aircraft wing, through which air under pressure is circulated by suitable pumping means, said system comprising: a fluid line for conducting the air from said pumping means to said D-duct; a valve means including a movable valve element in said fluid line for varying the flow through said D-duct so as to control the pressure therein; a servomotor for actuating said valve means; and means for regulating the action of said servomotor, said regulating means comprising a primary control unit, a thermoresponsive control pilot, immediately operative, in response to temperature changes in the D-duct, to direct the operation of said primary control unit as to vary the operation of said servomotor, and a control device, responsive to the differential between the pressure in said D-duct and ambient pressure acting externally on said D-duct, for modifying the action of said pilot in a manner to effect, through said servomotor, a corrective action upon the flow in said D-duct so as to automatically restore the aforesaid differential toward a normal value in response to any deviation from said normal value.

2. A control system for regulating the flow of air under pressure from a pumping means through a D-duct of an aircraft wing leading edge structure in an anti-icing apparatus, said system comprising: a fluid line for conducting the air from said pumping means to said D-duct; valve means including a movable valve element in said fluid line for immediately controlling said flow to maintain a differential in pressure within said duct over ambient pressure to which the exterior of said duct is subjected; a servomotor for immediately setting the position of said valve means to determine said flow; a primary control unit directly controlling the operation of said servomotor; a control pilot for immediately regulating the operation of said primary control unit in controlling said servomotor; and pressure differential responisve control means for supervising the operation of said control pilot, said differential responsive means comprising a housing defining a pressure chamber, differential pressure responsive bellows within said chamber, externally subjected to the pressure therein and internally subjected to the aforesaid ambient pressure; means communicating the interior pressure of said D-duct with said chamber; whereby said bellows responds to change in the aforesaid differential, said bellows acting upon said pilot to regulate the operation of said servomotor in a manner to establish a corrective action upon the flow in said D-duct tending always to automatically restore the same to the normal differential over ambient pressure.

3. A control system for regulating the operation of an aircraft wing anti-icing apparatus of the heated air type including a D-duct in the leading edge of the wing, conduit means for directing a flow of heated air under pressure through said D-duct, pumping means for producing said flow of air, and an electrically actuated throttle valve in the conduit means for varying said flow, said control system comprising: an electric actuator for positioning said valve; primary control unit in the form of a bridge circuit for controlling said actuator; a temperature responsive pilot exercising primary control over said bridge circuit; a pressure responsive follow-up pilot for resetting the control point of said primary control unit as a function of delivered air flow; an override pressure controller for limiting the pressure in the D-duct to a predetermined safe maximum value when the primary control unit is calling for air flow such as to cause a back pressure exceeding said maximum value, said controller including a pneumatic safety valve for limiting said duct pressure to said maximum safe value, said safety valve including means for sensing and preventing excessive pressure rise in the D-duct tending to result from overshooting of said maximum value; an overheat limit control unit for overriding said pneumatic safety valve to cause the latter to move toward its closed position and including an overheat warning lamp to provide an overheat warning signal; and fail-safe means cooperating with said safety valve to cause the latter to close in the event of failure of the electrical system.

4. In a fluid flow system having means for supplying fluid under pressure therein: a duct; a throttling valve therein; a pneumatic actuator for said valve; a pressure line from the upstream side of said valve, leading to said pneumatic actuator for directing a portion of said fluid under pressure to said actuator; a discharge bleed line from said pneumatic actuator to a region of lower pressure; a single pilot valve in said discharge bleed line; pressure sensitive control means for controlling said pilot valve; said pneumatic actuator including a casing and a power piston, said casing having large and small cylinders of different diameters and said piston having larger and small piston heads fitted within the respective cylinders, the area of the large piston head being twice the area of the small piston head; said casing cooperating with the wall of said piston between said heads to define a high pressure chamber; said heads cooperating with the respective ends of said casing to define respective intermediate pressure chambers; said pressure line communicating with said high pressure chamber; said piston heads having clearance in said cylinders such as to provide predetermined fluid bleeds past the respective heads into said intermediate pressure chambers; a piston rod providing an operating connection between said piston and said valve, the end of said small cylinder having an aperture through which said piston rod extends with clearance providing a bleed to atmosphere from the intermediate pressure chamber of said small cylinder; means on said small cylinder end and on said piston rod, respectively, for sealing said last mentioned bleed when said small piston head is at a near point with respect to the end of its respective cylinder; said pressure sensitive pilot valve controlling the bleed of air past the large piston to said region of lower pressure; the relation between said pilot valve, the piston areas and the bleeds past the piston heads being such that when the large piston is exposed to fluid pressure and said pilot valve is closed, pressure of fluid bleeding past said large cylinder head will act thereon to move said piston toward the small cylinder; whereby, by maintaining the pilot valve aperture area equal to that of the piston clearance bleed area, said piston may be maintained in any adjusted position thereof and whereby, due to the fact that the piston's clearance area is constant, the pilot valve area, for zero piston motion, will remain constant and thereby will not require a shift in the control point of the pressure sensitive control means in order to maintain zero motion.

5. A control system for regulating the operation of an aircraft anti-icing apparatus including: a "D" duct in said aircraft's wing leading edge, said D-duct having a discharge end provided with a restricted opening; conduit means for circulating air under pressure through said D duct; pumping means for producing said circulation; a valve for regulating the flow in said conduit means in a manner to regulate the differential in the pressure within said duct over ambient pressure acting against the exterior of said duct; a pneumatic servomotor for actuating said valve; a pilot valve for regulating the operation of said pneumatic servomotor; and means responsive to changes in the aforesaid differential, for regulating the operation of said pilot valve in a manner to automatically restore said differential toward its normal value in response to each deviation therein from the normal value.

6. A control system for regulating the operation of an aircraft anti-icing apparatus including a D duct in the leading edge of the aircraft wing, conduit means for directing a flow of heated air under pressure through said D duct, and pumping means for producing said circulation of air, said control system comprising: a valve for regulating the flow in said conduit means in a manner to normally maintain a selected differential of pressure in said D duct over ambient pressure acting against the exterior thereof; a pneumatic servomotor including a piston having large and small cylinders and large and small heads operating respectively therein, said servomotor having a high pressure chamber defined between said cylinders and the area of said piston lying between said heads and having intermediate pressure chambers defined between respective ends of said cylinders and the respective heads and communicating with said high pressure chamber through restricted air bleeds past the respective heads; means for bypassing a portion of the air under pressure delivered from said pump into said high pressure chamber; means providing a restricted escape of air from the intermediate pressure chamber adjacent the small head; a pilot valve controlling the escape of air from the other of said intermediate pressure chamber; and a control element responsive to the aforesaid pressure differential for regulating the operation of said pilot valve in a manner to automatically effect a corrective action in the flow through said D duct circuit so as to restore the said differential toward its normal value in response to each deviation therein from said normal value.

7. A control system as defined in claim 6, including means, responsive to remote manual control, for quickly reducing the pressure in said other intermediate pressure chamber for effecting a temporary reduction of the aforesaid differential toward a zero value.

8. A control system as defined in claim 6, including a resetting control element operative in series with said differential pressure responsive control element, for amplifying the initial response of the latter, said resetting control element having a rate of change action by which its amplifying action is gradually reduced so as to reset the control point of said differential pressure responsive control element to prevent hunting in the control response thereof.

9. A control system for regulating the operation of an aircraft anti-icing apparatus including a D duct in the leading edge of the aircraft wing, conduit means for directing a flow of heated air under pressure through said D duct, and pumping means for producing said circulation of air, said control system comprising: a valve for regulating the flow in said conduit means in a manner to normally maintain a selected differential of pressure in said D duct over ambient pressure acting against the exterior thereof; a pneumatic servomotor including a piston having large and small cylinders and large and small heads operating respectively therein, said servomotor having a high pressure chamber defined between said cylinders and the area of said piston lying between said heads, and having intermediate pressure chambers defined between respective ends of said cylinders and the respective heads and communicating with said high pressure chamber through restricted air bleeds past the respective heads; means for bypassing a portion of the air under pressure delivered from said pump into said high pressure chamber; means providing a restricted escape of air from the intermediate pressure chamber adjacent the small head; a pilot valve for regulating the rate of escape of air from the other intermediate pressure chamber; and pressure responsive means for actuating said pilot valve, comprising a housing providing a control chamber, means communicating the internal pressure of said D duct into said control chamber; a D. P. bellows within said control chamber; means on which said bellows is mounted, said means defining a passage communicating ambient pressure to the interior of said bellows; said bellows responding to the differential of said internal D duct pressure, operating externally of said bellows within said control chamber, over ambient pressure operating internally of said bellows; a resetting bellows mounted in tandem upon said D. P. bellows and having a restricted orifice communicating its interior with said chamber; said resetting bellows being arranged to communicate changes in the combined length of both bellows to said pilot valve for opening and closing the same in a manner to regulate the pressure in said other intermediate pressure chamber so as to actuate said servomotor in a manner to effect a corrective action in the flow in said conduit means so as to automatically restore the aforesaid pressure differential toward a normal value in response to each deviation therein from said normal value; said resetting bellows being effective in response to sudden high magnitude changes in the aforesaid differential, to amplify the initial response of said D. P. bellows and to then gradually reduce the response of said D. P. bellows in a manner to avoid hunting.

10. In a fluid system the combination comprising fluid flow control means, a housing providing a control chamber, means communicating the pressure of the flow controlled fluid into the control chamber, a differential pressure control bellows within the control chamber, means on which the bellows is mounted defining a passage communicating ambient pressure to the interior of the bellows, the bellows responding to the differential of the pressure operating externally of the bellows within the control chamber over ambient pressure operating internally of the bellows, a resetting bellows mounted in tandem upon the differential pressure bellows and having a restricted orifice communicating its interior with the chamber, a pilot valve controlled by the combined length of both bellows and serving to control the operation of the fluid flow controlling means, and the resetting bellows being effective in response to sudden high magnitude changes in the aforesaid differential, to amplify the initial response of the differential pressure bellows and to then gradually reduce the response of the differential pressure bellows in a manner to avoid hunting.

11. In a fluid system the combination comprising fluid flow regulating means, a bellows having means for providing restricted fluid communication between its interior and its exterior to gradually produce an equilibrium pressure condition responsive to any variations in pressure on one side of the bellows, and means controlled by the bellows for controlling the operation of the regulating means.

12. For use in a fluid flow system, a bellows arrangement including a first bellows with means for communicating pressure to the interior thereof, and a second bellows in series with the first bellows, and having an orifice providing restricted fluid communication between its interior and exterior to gradually produce an equilibrium pressure condition responsive to any variations in pressure on one side of the bellows, means for applying a variable pressure against the exterior of both bellows, and means actuated by the bellows arrangement for regulating fluid flow, the first bellows being adapted to cause the actuation of the means when the magnitude of the difference in pressure between its inside pressure and the exterior pressure is a selected amount, and the second bellows being adapted to cause the actuation of the means upon a sudden change in the pressure against the exterior of the second bellows, the effect upon the actuated means continually decreasing as the flow of fluid through the orifice continually acts to produce an equilibrium pressure condition between the interior and exterior of the bellows.

References Cited in the file of this patent

UNITED STATES PATENTS

| | | |
|---|---|---|
| 1,668,062 | Foerch | May 1, 1928 |
| 1,756,824 | Hasemann | Apr. 29, 1930 |
| 1,897,845 | Hilgers | Feb. 14, 1933 |
| 2,064,935 | McFall et al. | Dec. 22, 1936 |
| 2,119,153 | Dallenbach | May 31, 1938 |
| 2,139,126 | Jennings | Dec. 6, 1938 |
| 2,145,641 | Baker | Jan. 31, 1939 |
| 2,250,946 | Brown et al. | July 29, 1941 |
| 2,251,246 | Annin | July 25, 1941 |
| 2,337,426 | Taylor et al. | Dec. 21, 1943 |
| 2,373,255 | McGoldrick | Apr. 10, 1945 |
| 2,437,318 | Field | Mar. 9, 1948 |
| 2,455,250 | Hallinan | Nov. 30, 1948 |
| 2,469,375 | Flagle | May 10, 1949 |
| 2,484,850 | Paget | Oct. 18, 1949 |
| 2,560,210 | Browne | July 10, 1951 |
| 2,705,866 | Quinby et al. | Apr. 12, 1955 |